March 31, 1925.  1,531,559
J. W. LYNCH
TRAVELING FUNNEL GUIDE FOR GLASS FORMING MACHINES
Filed April 11, 1924  2 Sheets-Sheet 1
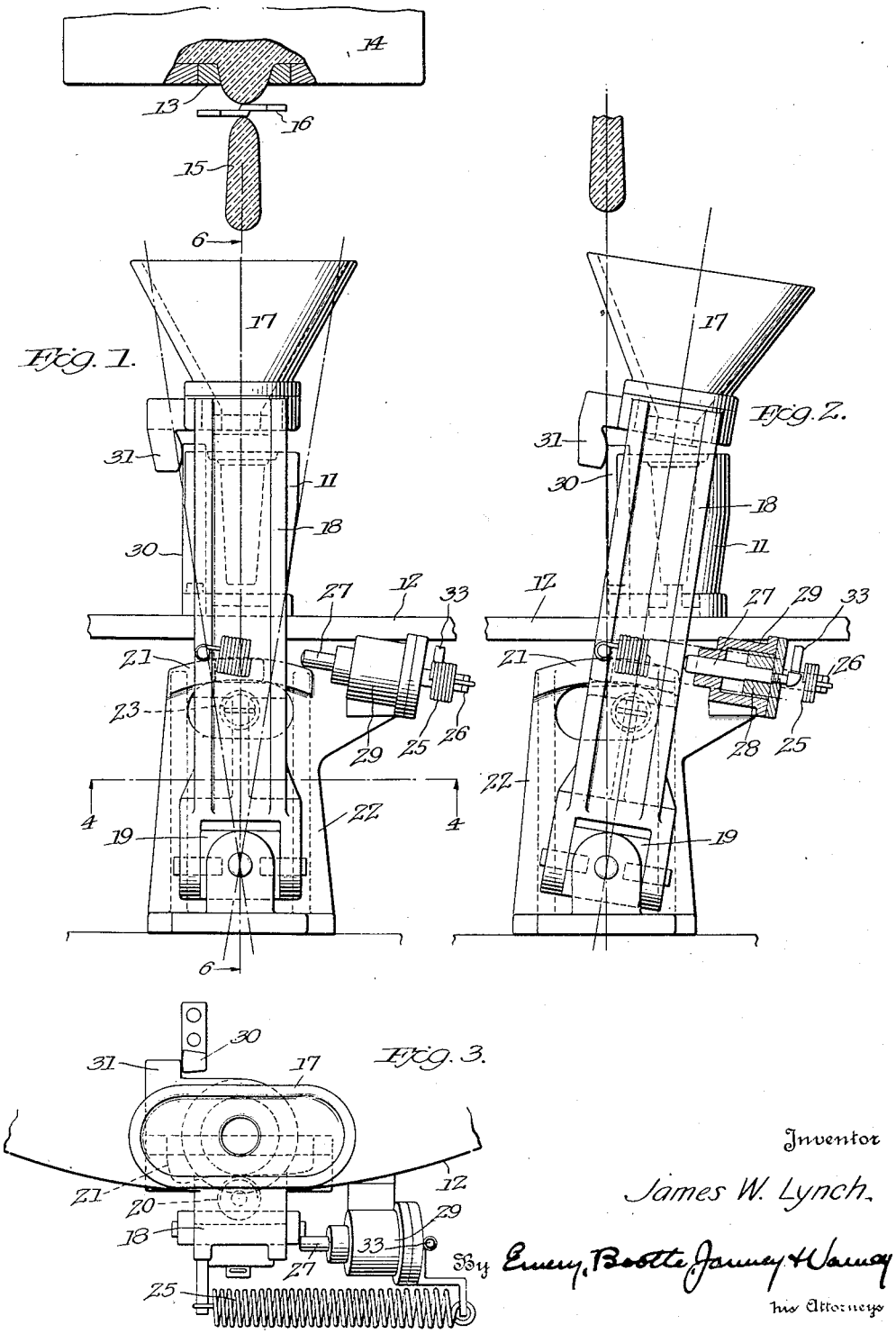
Inventor
James W. Lynch,
his Attorneys March 31, 1925.  
J. W. LYNCH  
1,531,559  
TRAVELING FUNNEL GUIDE FOR GLASS FORMING MACHINES  
Filed April 11, 1924   2 Sheets-Sheet 2
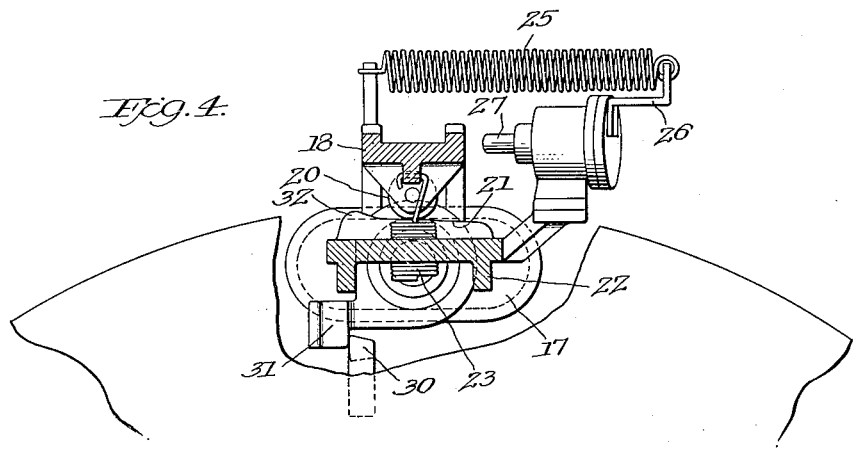
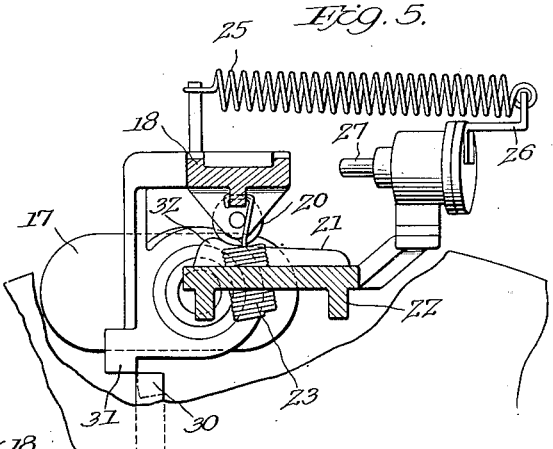
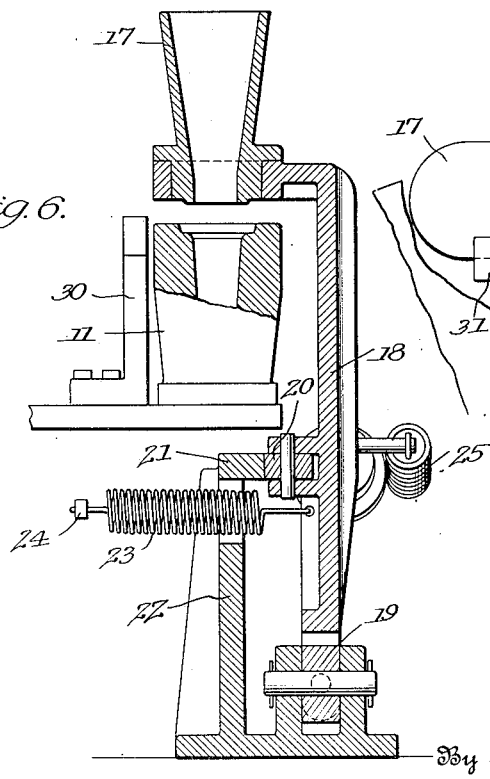
Inventor  
James W. Lynch  
By Emery, Booth, Janney & Varney  
his Attorneys Patented Mar. 31, 1925.

1,531,559

UNITED STATES PATENT OFFICE.

JAMES W. LYNCH, OF ANDERSON, INDIANA, ASSIGNOR TO LYNCH GLASS MACHINERY COMPANY, OF ANDERSON, INDIANA, A CORPORATION OF INDIANA.

TRAVELING FUNNEL GUIDE FOR GLASS-FORMING MACHINES.

Application filed April 11, 1924. Serial No. 705,728.

*To all whom it may concern:*

Be it known that I, JAMES W. LYNCH, a citizen of the United States, residing at Anderson, in the county of Madison and State of Indiana, have invented an Improvement in Traveling Funnel Guides for Glass-Forming Machines (1), of which the following description, in connection with the accompanying drawings, is a specification, like characters on the drawings representing like parts.

This invention relates to feeding charges of molten glass from a tank to the molds of glass forming machines, more particularly of the type having continuously moving molds traveling in a circular path.

The invention aims to provide automatic means for guiding the "gobs" or "gathers" of glass, which are cut off in quick succession from a valve controlled intermittent or freely falling stream issuing from the tank by any suitable severing means, commonly designated a "feeder," into the moving molds as they pass successively beneath the orifice from the tank.

Other aims and advantages of the invention appear in connection with the description of the illustrative embodiment of the invention shown in the drawings, wherein—

Fig. 1 is a side view of the device as it appears in its mid-position of movement;

Fig. 2 is a similar view, showing the device in its normal position ready to be engaged by a moving part of the machine for guiding a gather of glass into a mold;

Fig. 3 is a plan view of the funnel guide and a portion of the rotating table carrying the molds;

Fig. 4 is a horizontal cross-section of the device on the line 4—4 in Fig. 1, looking from beneath in the direction of the arrows;

Fig. 5 is a view similar to Fig. 4, showing the parts at the end of the guiding movement of the funnel about to be disengaged by the moving part to permit its return to normal position as shown in Fig. 2; and Fig. 6 is a vertical cross-section of the funnel guide and mold on the line 6—6 in Fig. 1, showing the mold and table partly in side elevation.

Glass forming machines heretofore in successful use with automatic devices for feeding them glass direct from the tank have generally been intermittent in their mode of operation, the molds being filled with glass while stationary. This mode of operation is hard on the machinery and slow, as it necessitates repeated starting and stopping. In the glass forming machine shown in the drawings for illustrating one mode of performing the invention, the molds 11 are mounted on a continuously rotating table 12 or support of any suitable kind, and are successively brought beneath the orifice 13 of the glass melting tank or container 14 for receiving their charges of molten glass. This is periodically cut off in the shape of drops 15, called "gobs" or "gathers," by shears 16 operated by any suitable mechanism, known as a "feeder." The "feeder" apparatus for cutting off the drops at required intervals and in suitable shapes for proper working in the glass forming machine forms no part of this invention.

A funnel 17, preferably elongated in the direction of movement of the table, is mounted on the upper end of an arm 18, which is pivoted at its lower end to a gimbal block 19 to oscillate freely back and forth in a plane substantially parallel to the direction of movement of the adjacent edge of the table. By reason of its universal joint mounting, the arm 18 is free to swing toward and away from the edge of the table, and is guided in its swinging movement by a roller 20 (see Figs. 3 to 6) which bears against a short curved track 21 carried by the bracket 22 which supports the pivoted gimbal block 19. The curve of this track preferably conforms for most of its length to the circle in which the molds move. A spring 23, connected at one end to the arm 18 and at its other end to a fixed arm 24 on a suitable part of the frame (see Fig. 6) tends to hold the arm 18 normally with the roller 20 against the track 21. A second spring 25, which is connected at one end to the arm 18 and at its other end to a fixed bracket arm 26, normally holds the arm 18 against a stop pin 27 carried by a piston 28 working in an air cylinder 29 (see Fig. 2).

The table 12 carries adjacent to each mold an upwardly projecting spring finger 30 or other suitable abutment having a driving face for engaging a latch portion 31 of the arm 18 or funnel 17 to swing the latter in time with the mold as each mold passes the feeding position. At the end of the swinging movement the roller 20 rides upon a hump 32 on the end of the curved track 21 and throws the arm and latch out of engagement with the finger 30, whereupon the spring 25 returns the arm and funnel to normal position. The end of the return movement of the arm is cushioned by the piston and cylinder arrangement for supporting the stop pin 27, air pressure being supplied thereto for this purpose through the pipe 33.

The funnel is of sufficient width of opening at its top to catch the drop of glass in whatever position it may be when the drop is sheared off, and as the lower end of the funnel is shaped to conform to the opening into the mold and is constrained to follow the circular path of the molds, the drop will be guided into the mold.

The operation of the guide funnel is entirely automatic, and timed to suit the speed of operation of the machine; and the arrangement of the springs and cushioning devices for moving the funnel arm is such as to permit of high speed of operation without excessive shock upon the operating parts.

The invention is not restricted to the forms and arrangement of parts shown, but may be adapted to forming machines of various types having continuously moving molds.

Having described a preferred form of the invention without limiting myself thereto, I claim the following:

1. A traveling funnel guide for forming machines having moving molds traveling in a curvilinear path, comprising a supporting member having a universal joint mounting, means for guiding the supporting member in a path parallel to the path of movement of the molds, a funnel carried by said supporting member, and engaging means moving with the molds for engaging and moving said funnel in time with successive molds.

2. A traveling funnel guide for forming machines having moving molds traveling in a curvilinear path, comprising a supporting member having a universal joint mounting, means for guiding the supporting member in a path parallel to the path of movement of the molds, a funnel carried by said supporting member, and means operating in synchronism with the molds for moving said funnel in time with successive molds.

3. A traveling funnel guide for forming machines having moving molds traveling in a curvilinear path, comprising a supporting member having a universal joint mounting disposed below the path of movement of the molds, said supporting member extending above said path, means for guiding the supporting member in a path parallel to the path of movement of the molds, a funnel carried by said supporting member, and means operating in synchronism with the molds for moving said funnel in time with successive molds.

4. A traveling funnel guide for forming machines having moving molds traveling in a curvilinear path, comprising a supporting member having a universal joint mounting, a fixed cam disposed adjacent to the path of movement of the molds and means cooperating therewith for guiding the supporting member in a path parallel to the path of movement of the molds, a funnel carried by said supporting member, and means operating in synchronism with the molds for moving said funnel in time with successive molds.

5. A traveling funnel guide for forming machines having moving molds traveling in a curvilinear path, comprising a supporting member having a universal joint mounting, means for guiding the supporting member in a path parallel to the path of movement of the molds, a funnel carried by said supporting member, engaging means moving with the molds for engaging and moving said funnel in time with successive molds, resilient means for returning said funnel to normal position and means disposed adjacent to the path of movement of said molds for disengaging said engaging means to permit said funnel to be returned.

6. A traveling funnel guide for forming machines having moving molds traveling in a curvilinear path, comprising a supporting member having a universal joint mounting, a fixed cam disposed adjacent to the path of movement of the molds and means cooperating therewith for guiding the supporting member in a path parallel to the path of movement of the molds, a funnel carried by said supporting member, engaging means moving with the molds for engaging and moving said funnel in time with successive molds, resilient means for returning said funnel to normal position, and a protuberance on said cam for disengaging said funnel engaging and moving means to permit said funnel to be returned.

7. A traveling funnel guide for forming machines having moving molds traveling in a curvilinear path comprising a supporting member 18 mounted on a gimbal block 19 and a funnel 17 carried thereby with its spout over the path of movement of the molds, a cam 21 adjacent the path of movement of the molds, a follower 20 carried by the supporting member and cooperating with said cam, a driving member 30 movable with the molds, and a cam portion 32 for disengaging said funnel guide from said driving member at the end of the travel of said funnel.

8. A traveling funnel guide for forming machines having molds traveling in a curvilinear path comprising a supporting arm pivoted at one end and having a funnel at its free end, driving abutments movable in time with said molds, a latch movable with said supporting arm and adapted to be engaged successively by said driving abutments, and means for shifting said latch to disengage it from said driving abutments at the end of the travel of said funnel.

In testimony whereof, I have signed my name to this specification.

JAMES W. LYNCH.